(12) United States Patent
Bickell et al.

(10) Patent No.: US 8,107,713 B2
(45) Date of Patent: Jan. 31, 2012

(54) REDUCTION OF INCORRECTLY IDENTIFIED DOCUMENT SCANNING DEFECTS

(75) Inventors: Gary A. Bickell, Canton, MI (US); Robert J. D'Aoust, Detroit, MI (US); James J. Young, Livonia, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1011 days.

(21) Appl. No.: 12/036,339

(22) Filed: Feb. 25, 2008

(65) Prior Publication Data

US 2009/0214085 A1    Aug. 27, 2009

(51) Int. Cl.
*G06K 9/00* (2006.01)
(52) U.S. Cl. ........................................ 382/137
(58) Field of Classification Search .......... 382/135, 382/137, 140; 705/42, 44, 45; 209/534; 902/4, 6, 7, 13; 358/1.14, 2.1, 3.26, 405, 358/462; 356/390; 348/128; 714/48, 700
See application file for complete search history.

(56) References Cited

U.S. PATENT DOCUMENTS

| | | | |
|---|---|---|---|
| 6,348,980 B1 * | 2/2002 | Cullen et al. | 358/1.9 |
| 2004/0008884 A1 * | 1/2004 | Simske et al. | 382/165 |
| 2005/0243379 A1 * | 11/2005 | Klein et al. | 358/3.27 |
| 2006/0203288 A1 * | 9/2006 | Liccini et al. | 358/1.18 |
| 2008/0063240 A1 * | 3/2008 | Keng et al. | 382/112 |

* cited by examiner

*Primary Examiner* — Jason M Repko
*Assistant Examiner* — Shervin Nakhjavan
(74) *Attorney, Agent, or Firm* — Honigman Miller Schwartz and Cohn LLP

(57) ABSTRACT

In general, this disclosure describes techniques of reducing the possibility of an image evaluation device incorrectly identifying defects in images of documents. Some defects may be apparent in the images of both sides of a document. For instance, a tear in a document could be apparent in an image of a front side and an image of a rear side of the document. However, the image evaluation device could erroneously identify such a tear in an image of one side of the document. In this case, the tear would not be apparent in the image of the other side of the document. To reduce the possibility that the image evaluation device erroneously identifies such a defect, the image evaluation device may determine whether defects identified in the image of the front side of the document correspond to defects identified in the image of the rear side of the document.

20 Claims, 8 Drawing Sheets

REDUCTION OF INCORRECTLY IDENTIFIED DOCUMENT SCANNING DEFECTS

TECHNICAL FIELD

The invention relates to electronic processing of financial documents.

BACKGROUND

When an individual or a business receives a physical financial document, such as a check, the individual or business may create a digital version of the financial document. In the case of a check, the digital version of the check may comprise a digital image of the check that conforms to certain standards along with appropriate metadata. Under the laws of the United States of America and other countries, the digital version of the financial document may be stored, redeemed, and otherwise used in the same manner as the physical financial document.

In many circumstances, financial institutions allow individuals and businesses to submit digital versions of checks received from other parties. Moreover, in many of these circumstances, financial institutions discourage individuals and businesses from submitting physical versions of checks received from other parties. Financial institutions may discourage individuals and businesses from submitting physical versions of checks because it may be more costly and time consuming to process physical versions of checks than equivalent digital versions of the checks.

In circumstances where financial institutions discourage individuals and businesses from submitting physical copies of checks, individuals and businesses may be responsible for generating digital versions of the checks prior to submission of the checks to the financial institutions. Moreover, in these circumstances, the individuals and businesses may be responsible for ensuring that digital images of the checks included in the digital versions of the checks have sufficient quality. In other words, the individuals and businesses may be responsible for ensuring that digital images of the checks are reasonably free of defects. Individuals and businesses may use automatic check scanning devices in order to ensure that digital images of the checks are reasonably free of defects.

SUMMARY

In general, this disclosure describes techniques of reducing the possibility of an image evaluation device incorrectly identifying defects in images of documents. Some defects may be apparent in the images of both sides of a document. For instance, a tear in a document could be apparent in an image of a front side and an image of a rear side of the document. However, the image evaluation device could erroneously identify such a tear in an image of one side of the document. In this case, the tear would not be apparent in the image of the other side of the document. To reduce the possibility that the image evaluation device erroneously identifies such a defect, the image evaluation device may determine whether defects identified in the image of the front side of the document correspond to defects identified in the image of the rear side of the document.

In one example, a method comprises receiving a first image. The first image is a digital image of a front surface of a document. The method also comprises receiving a second image. The second image is a digital image of a rear surface of the document. In addition, the method comprises identifying defects in the first image that could hinder use of the first image and the second image to process the document in an automated document processing system. Furthermore, the method comprises identifying defects in the second digital image that could hinder use of the first image and the second image to process the document in the automated document processing system. In addition, the method comprises determining whether a first defect corresponds to any of the defects in the second image. The first defect is one of the identified defects in the first image. The method also comprises outputting data that indicates that the first image and the second image include a defect that could hinder use of the first image and the second image in the automated document processing system when the first defect corresponds to one of the defects in the second image.

In another example, a system comprises an image evaluation device that includes a front defect detection module that identifies defects in a first image that could hinder use of a first image to process a document in an automated electronic document processing system. The first image is a digital image of a front surface of the document. In addition, the device comprises a rear defect detection module that identifies defects in a second image that could hinder use of the second image to process the document in the automated electronic document processing system. The second image is a digital image of a rear surface of the document. Furthermore, the device comprises a defect correspondence module that determines whether a first defect corresponds to any of the defects in the second image. The first defect is one of the identified defects in the first image. The device also an output module that outputs data that indicates that the first image and the second image include a defect that could hinder use of the first image and the second image in the automated document processing system when the first defect corresponds to one of the defects in the second image.

In another example, a computer-readable medium comprising instructions that, when executed by one or more processors, cause the one or more processors to receive a first image. The first image is a digital image of a front surface of a document. The instructions also cause the one or more processors to receive a second image. The second image is a digital image of a rear surface of the document. In addition, the instructions cause the one or more processors to identify defects in the first image that could hinder use of the first image and the second image to process the document in an automated document processing system. Furthermore, the instructions cause the one or more processors to identify defects in the second digital image that could hinder use of the first image and the second image to process the document in the automated document processing system. The instructions also cause the one or more processors to determine whether a first defect corresponds to any of the defects in the second image. The first defect is one of the identified defects in the first image. In addition, the instructions cause the one or more processors to generate data that indicates that the first image and the second image include a defect that could hinder use the first image and the second image in the automated document processing system when the first defect corresponds to one of the defects in the second image.

The details of one or more embodiments of the invention are set forth in the accompanying drawings and the description below. Other features, objects, and advantages of the invention will be apparent from the description, drawings, and claims.

DETAILED DESCRIPTION

Figure 1:
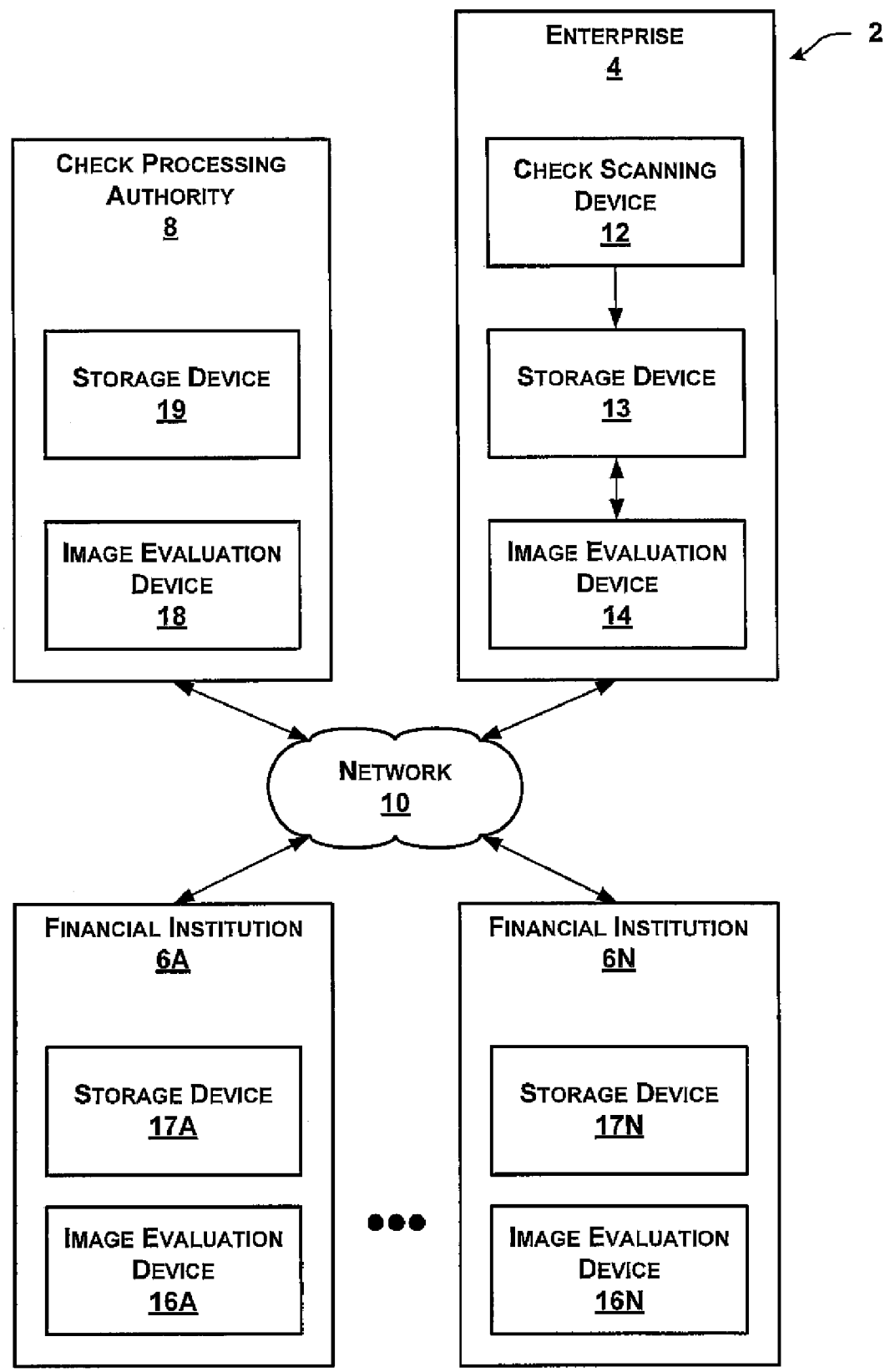
FIG. 1 is a block diagram illustrating an example system that includes components that perform a check processing operation.

FIG. 1 is a block diagram illustrating an example system 2 that includes components that perform a check processing operation. It should be appreciated that FIG. 1 is provided for explanatory purposes and that the principles and techniques of this invention, as defined in the claims section of this disclosure, are not necessarily limited to embodiments that conform to FIG. 1 or its related description.

This disclosure explains FIGS. 1-8 in the context of checks and automated check clearing systems. However, it should be understood that the techniques of this disclosure may be practiced with any type of printed document and any type of automated document processing system. For instance, the techniques of this invention may be practiced on documents such as forms, remittance slips, legal documents, drivers license applications, tax returns, orders, invoices, and other types of documents.

As described in this disclosure, components of system 2 capture a digital image of the front side of a check and a digital image of the rear side of the check. Components of system 2 then analyze the digital image of the front side of the check and the digital image of the rear side of the check for defects. Next, components of system 2 may compare the defects identified in the digital image of the front side of the check and the defects identified in the digital image of the rear side of the check. If any of the identified defects should be present in both of the digital images, but were only identified in one of the digital images, then components of system 2 may determine that the defects was incorrectly identified. System 2 may be advantageous because the components of system 2 may reduce the likelihood of misidentification of defects, thereby saving time and money.

As illustrated in the example of FIG. 1, system 2 includes an enterprise 4, a set of financial institutions 6A through 6N (collectively, "financial institutions 6"), a check processing authority 8, and a network 10. Network 10 facilitates communication among enterprise 4, financial institutions 6, and check processing authority 8. Network 10 may include a plurality of devices that communicate via one or more communication links. As such, network 10 may be a local area network (e.g., an Ethernet, a WiFi network, etc.), a wide area network, a telephone network, a metropolitan area network, a cellular telephone network, a global area network, an inter-network (e.g., the Internet), an intranet, an extranet, or another type of network. Communication links between devices within network 10 may be wired communication links and/or wireless communication links.

Enterprise 4 may be a business entity (e.g., a corporation, partnership, limited partnership, sole proprietorship, limited liability company, etc.), a non-profit entity (e.g., a charity, a university, a school, a non-governmental organization, etc.), a governmental entity (e.g., a governmental bureau, office, agency, service, tax collection authority, etc.), or another type of public or private enterprise. Furthermore, although the example of FIG. 1 is explained with regard to enterprise 4, an individual acting in a private capacity may practice the principles and techniques of this invention in place of enterprise 4.

Enterprise 4 may receive checks from other parties. As used in this disclosure, a "check" is a draft, payable on demand and drawn on or payable through or at an office of a bank, whether or not negotiable, that is handled for forward collection or return. For example, a check may be a personal check, a traveler's check, a business check, a payroll check, a bearer check, a counter check, a money order, or another type of check.

Enterprise 4 may receive checks from other parties for a variety of reasons. For example, enterprise 4 may receive checks from other parties in exchange for goods and services provided by enterprise 4. In a second example, enterprise 4 may receive a check from another party for processing on behalf of the other party. In a third example, enterprise 4 may receive checks as donations.

In the example of FIG. 1, enterprise 4 may submit the checks to one of financial institutions 6 (e.g., financial institution 6A) that holds an account to which enterprise 4 wishes to deposit the check. Each of financial institutions 6 may be one or more of: a banking institution, a savings and loan association, a credit union, a mutual savings bank, a building society, or another type of financial institution. When enterprise 4 submits a check to financial institution 6A, financial institution 6A may provide the check to a check processing authority 8. Check processing authority 8 may be a public or private entity that coordinates check processing between financial institutions 6. For example, in the United States of America, check processing authority 8 may be the Federal Reserve System. When check processing authority 8 receives a check from financial institution 6A, check processing authority 8 may draw funds from a financial institution named by the check and transfer those funds to an account held by financial institution 6A for enterprise 4. After the funds are transferred to the account (i.e., after the check "clears"), enterprise 4 may have free access to the funds.

Alternatively, when enterprise 4 is a financial institution, enterprise 4 may submit the checks directly to check processing authority 8. Furthermore, in some circumstances, two or more of financial institutions 6 may perform a check clearing operation directly without the assistance of check processing authority 8.

Depending on the terms of an agreement between enterprise 4 and financial institution 6A, financial institution 6A may encourage enterprise 4 to submit digital versions of checks rather than physical versions of checks. As used in this disclosure, a "digital version of a check" is a set of digital information that comprises a digital image of the front side of the check, a digital image of the reverse side of the check, and appropriate metadata that describes the check. For instance, in the context of the American Check Clearing for the $21^{st}$ Century Act ("Check 21 Act"), "truncated checks" are "digital versions of checks."

The format of digital versions of checks may be controlled by governmental regulation, industry standards, or other voluntary or mandatory rules. For example, in the United States, the Check 21 Act does not mandate a specific image quality level for digital images of an original check in a "truncated check", but does mandate that substitute checks produced from images of original checks have sufficient quality to be used as the original check. In another example, in the United States, the Check 21 Act mandates that "truncated checks"

include metadata that specifies the Magnetic Ink Character Recognition (MICR) field of the original check. The MICR field of a check may be the portion of the check that specifies a bank routing number, an account number, and possibly a check number. In the United States, the MICR fields of checks are formatted in the E13B character font.

In order to capture digital images of checks for the purpose of generating digital versions of the checks, enterprise 4 may include a check scanning device 12. As described in detail below, check scanning device 12 may receive a check and capture digital images of both sides of the check. In addition, enterprise 4 may include a storage device 13 that stores digital images generated by check scanning device 12 and uses the stored digital images to generate digital versions of checks. Moreover, enterprise 4 may include an image evaluation device 14 that verifies the image quality of the digital images captured by check scanning device 12. It should be appreciated that in some implementations, the functionality of check scanning device 12, the functionality of storage device 13, and/or the functionality of image evaluation device 14 may be integrated into a single device. If image evaluation device 14 verifies the image quality of the digital images of the check, storage device 13 may cause a digital version of the check to be used in an automated check clearing process. For example, storage device 13 may cause the digital version of the check to be used in an automated check clearing process by transmitting the digital version of the check via network 12 to a one of financial institutions 6 that holds an account for enterprise 4. In another example, if enterprise 4 is a financial institution, storage device 13 may cause the digital version of the check to be used in an automated check clearing process by transmitting the digital version of the check via network 12 directly to check processing authority 8 or to one of financial institutions 6.

When image evaluation device 14 verifies the image quality of the digital images of the check, image evaluation device 14 may identify defects in the digital image of the front side of the check and may identify defects in the digital image of the rear side of the check. As discussed above, the digital images of the check may include one or more defects. As used in this disclosure, a "defect" in a digital image of a side of a check is some aspect of the digital image that could hinder use of the digital image to process the check during an automated electronic check clearing process. Some defects may be "document deficiencies." Document deficiencies are issues with the document pictured in the digital images. Example document deficiencies may include folds, tears, smudges, ink blots, and other aspects of the check that could hinder the use of digital images of the check during an automated electronic check clearing process.

Some defects may only be apparent to image evaluation device 14 from the digital image of one side of the check. For example, a digital image of a check may be too dark or too light. In other words, the image may be underexposed or overexposed. When a digital image of a check is too dark or too light, important information in the digital image of the check may be impossible to read. For instance, when the digital image of the check is too dark or too light, it may be impossible to read the MICR code line of the check. In another example of a defect that may only be apparent to image evaluation device 14 from the digital image of one side of the check, image evaluation device 14 may determine that the check has not been signed.

Some defects may be apparent to image evaluation device 14 from the digital images of both sides of the check. For case of explanation, defects that are apparent from the digital images of both sides of a check are referred to herein as "symmetric defects." For example, torn or folded edges or corners of a check may be symmetric defects. In this example, it may appear to image evaluation device 14 that a digital image of a check reveals that a corner or an edge of the check is torn or folded. When a corner or an edge of a check is torn or folded, important information in the digital image of the check may be impossible to read. For instance, a corner of the check may be folded such that the monetary amount of the check is obscured. In another instance, the check may be torn such that the characters in the MICR code line of the check are no longer in a straight line. In this example, image evaluation device 14 may interpret a digital image of one side of the check to reveal that a part of the check is torn or folded. However, there may be circumstances in which check scanning device 12 erroneously interprets the digital image of one side of the check to reveal that the part of the check is torn or folded. However, if the part of the check is actually torn or folded, both the digital image of the front side of the check and the digital image of the rear side of the check would reveal that the part of the check is torn or folded. If image evaluation device 14 interprets only one of the digital images of the check to reveal that the part of the check is torn or folded, then image evaluation device 14 may determine that the part of the check is not actually torn or folded.

In another example of a symmetric defect, image evaluation device 14 could interpret an image of one side of a check to be "skewed" to an extent that information on the check is unreadable. As used herein, a digital image of a check is "skewed" when a lengthwise edge of the check is not parallel to a lengthwise axis of the digital image. When the lengthwise edge of a check in a first digital image is at a greater angle to the lengthwise axis of the digital image than the angle at which a lengthwise edge of a check in a second digital image differs from a lengthwise axis of the second digital image, the first digital image is skewed to a greater degree than the second digital image. In this example, image evaluation device 14 could determine that the digital images of the check are excessively skewed when both the digital image of the front side of the check has excessive skew and the digital image of the rear side of the check has excessive skew. However, if the digital image of the front side of the check has excessive skew and the digital image of the rear side of the check does not have excessive skew, there is a high probability that the digital image of the front side of the check does not have excessive skew. Similarly, if the digital image of the rear side of the check has excessive skew and the digital image of the front side of the check does not have excessive skew, there is a high possibility that the digital image of the front side of the check does not actually have excessive skew.

Accordingly, after image evaluation device 14 identifies defects in the digital image of the front side of the check and identifies defects in the digital image of the rear side of the check image evaluation device 14 may determine whether the identified symmetric defects in the digital image of the front side of the check correspond to the identified symmetric defects in the digital image of the rear side of the check. If an identified symmetric defect in the digital image of the front side of the check corresponds to an identified symmetric defect in the digital image of the rear side of the check, image evaluation device 14 may assume that the symmetric defect actually exists in the digital images of the check. Accordingly, when a symmetric defect actually exists in the digital images of the check, image evaluation device 14 may output to storage device 13 a flag that indicates that the digital images of the check include the symmetric defect.

After storage device 13 receives flags associated with digital images of a check from image evaluation device 14, storage device 13 may generate a digital version of the check that includes the flags. If one or more of the flags are raised, storage device 13 may perform a variety of actions. For instance, storage device 13 may output an alert to a user when one or more of the flags are raised. In another instance, storage device 13 may cause check scanning device 12 to rescan the check. If none of the flags are raised or if storage device 13 is configured to disregard the flags, storage device 13 may cause the digital version of the check to be used in an automated check clearing process.

As illustrated in the example of FIG. 1, financial institutions 6A through 6N include image evaluation devices 16A through 16N and storage devices 17A through 17N, respectively. This disclosure refers to image evaluation devices 16A through 16N collectively as "image evaluation devices 16" and refers to storage devices 17A through 17N collectively as "storage devices 17." When one of financial institutions 6 (e.g., financial institution 6A) receives a digital version of a check from enterprise 4, storage device 17A in financial institution 6A may store the digital version of the check. Moreover, financial institution 6A may be unwilling to assume that the digital images in the digital version of the check are usable in the automated check clearing process. Accordingly, image evaluation device 16A may use an operation that is similar to the operation performed by image evaluation device 14 in enterprise 4 to analyze the digital images in the digital version of the check for defects. Furthermore, storage devices 17A may cause the digital version of the check to be used in the automated check clearing process only when the image evaluation device 16A determines that digital images in the digital version of the check do not contain a symmetric defect. For instance, storage device 17A may cause the digital version of the check to be used in the automated check clearing process by submitting the digital version of the check to check processing authority 8. Although his paragraph described the operations of image evaluation device 16A and storage device 17A, it should be appreciated that images evaluation devices 16B through 16N and storage devices 17B through 17N may perform similar operations.

Furthermore, in the example of FIG. 1, check processing authority 8 may include an image evaluation device 18 and a storage device 19. When check processing authority 8 receives a digital version of a check from one of financial institutions 6, check processing authority 8 may store the digital version of the check using storage device 19. Furthermore, check processing authority 8 may be unwilling to assume that the digital images in the digital version of the check are useable in the automated check clearing process. Accordingly, image evaluation device 18 may perform an operation that is similar to the operation performed by image evaluation device 14 in enterprise 4 to analyze the digital images in the digital version of the check for defects. Furthermore, storage device 19 may cause the digital version of the check to be used in the automated check clearing process only when image evaluation device 18 determines that the digital images in the digital version of the check do not contain a symmetric defect. For instance, image evaluation device 18 may cause the digital version of the check to be used in the automated check clearing process by causing check processing authority 8 to perform the automated check clearing process on the digital version of the check.

By determining whether the identified defects in the front side of the check correspond to the identified defects in the rear side of the check, image evaluation devices 14, 16, and 18 may effectively reduce the possibility of erroneously identifying symmetric defects in the digital images of the check. By reducing the possibility of erroneously identifying symmetric defects in the digital images of the check, image evaluation devices 14, 16, and 18 are less likely to alert the user of the image evaluation devices that the digital images of a check cannot be used in the automated check clearing process. Because rescanning a check and creating a new digital version of the check may be time consuming and annoying to the user, the use of image evaluation devices 14, 16, and 18 may result in great productivity for the user and lower costs to enterprise 4, financial institutions 6, and check processing authority 8.

Furthermore, when an image evaluation device routinely requires the user to rescan checks that do not need repair, the user is likely to configure the image evaluation device to be less sensitive to defects in the digital images of a check. Configuring an image evaluation device to be less sensitive to defects in the digital images of a check may result in fewer instances of the image evaluation device demanding that the user rescan checks that do not need repair. However, configuring an image evaluation device to be less sensitive to defects in the digital images of a check may result in more instances of the image evaluation device transmitting digital versions of checks that actually contain defects. Many financial institutions charge fees to enterprises for each digital version of a check that contains defects. Consequently, reducing the possibility of erroneously identifying symmetric defects in the digital images of checks may result in a cost savings to enterprise 4 because financial institutions 6 will not charge enterprise 4 for as many digital versions of checks that contain defects.

Figure 2:
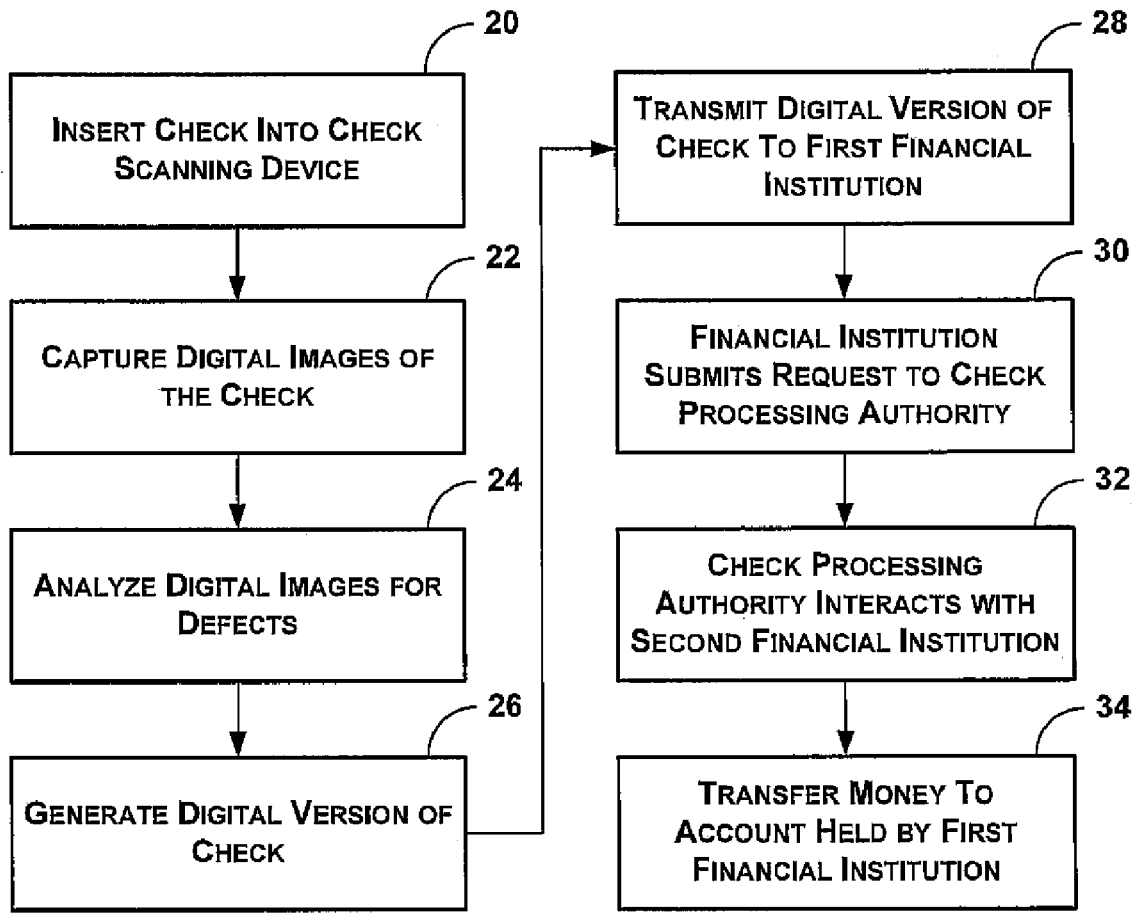
FIG. 2 is a flowchart illustrating an example check scanning operation.

FIG. 2 is a flowchart illustrating an example check clearing process. As illustrated in the example of FIG. 2, a check clearing process may begin when a user of check scanning device 12 inserts a check into a scanning area of check scanning device 12 (20). After the user inserts the check into the scanning area of check scanning device 12, check scanning device 12 may capture digital images of the front and rear sides of the check (22). Image verification device 14 may analyze the digital images of the front and rear sides of the check for defects (24). When image verification device 14 analyzes the digital images, image evaluation device 14 identifies defects in the digital image of the front side of the check that correspond to defects in the digital image of the rear side of the check. As a result of analyzing the digital images of the check, image verification device 14 may generate a set of flags that indicate defects in the digital images.

Next, storage device 13 may perform a process to create a digital version of the check (26). This digital version of the check may include the digital image of the front side of the check, the digital image of the rear side of the check, the MICR codeline of the check, and the flags generated by image verification device 14. In one example implementation, storage device 13 may generate the digital version of the check when the digital image of the front side of the check does not include a defect that corresponds to a defect in the digital image of the rear side of the check. Storage device 13 may ask the user to rescan the check until the digital image of the front side of the check does not include any defects that correspond to defects in the digital image of the rear side of the check.

After storage device 13 generates the digital version of the check, storage device 13 may transmit the digital version of the check to a first one of financial institutions 6 (e.g., financial institution 6A) (28). Financial institution 6A may be a financial institution that holds a bank account for enterprise 4. By transmitting the digital version of the check to financial institution 6A, enterprise 4 is indicating to financial institution 6A that financial institution 6A should ensure that the monetary amount indicated by the check is deposited in the bank account held by financial institution 6A for enterprise 4.

When financial institution 6A receives the digital version of the check, financial institution 6A may submit a request to process the digital version of the check to check processing authority 8 (30). The request to process the digital version of the check may be an Automated Clearing House (ACH) request. In response to the request from financial institution 6A, check processing authority 8 may interact with a financial institution specified by the digital version of the check (e.g., financial institution 6N) (32). When check processing authority 8 interacts with financial institution 6N, financial institution 6N may electronically transfer the amount of money indicated by the check to the bank account held by financial institution 6A (34).

Figure 3:
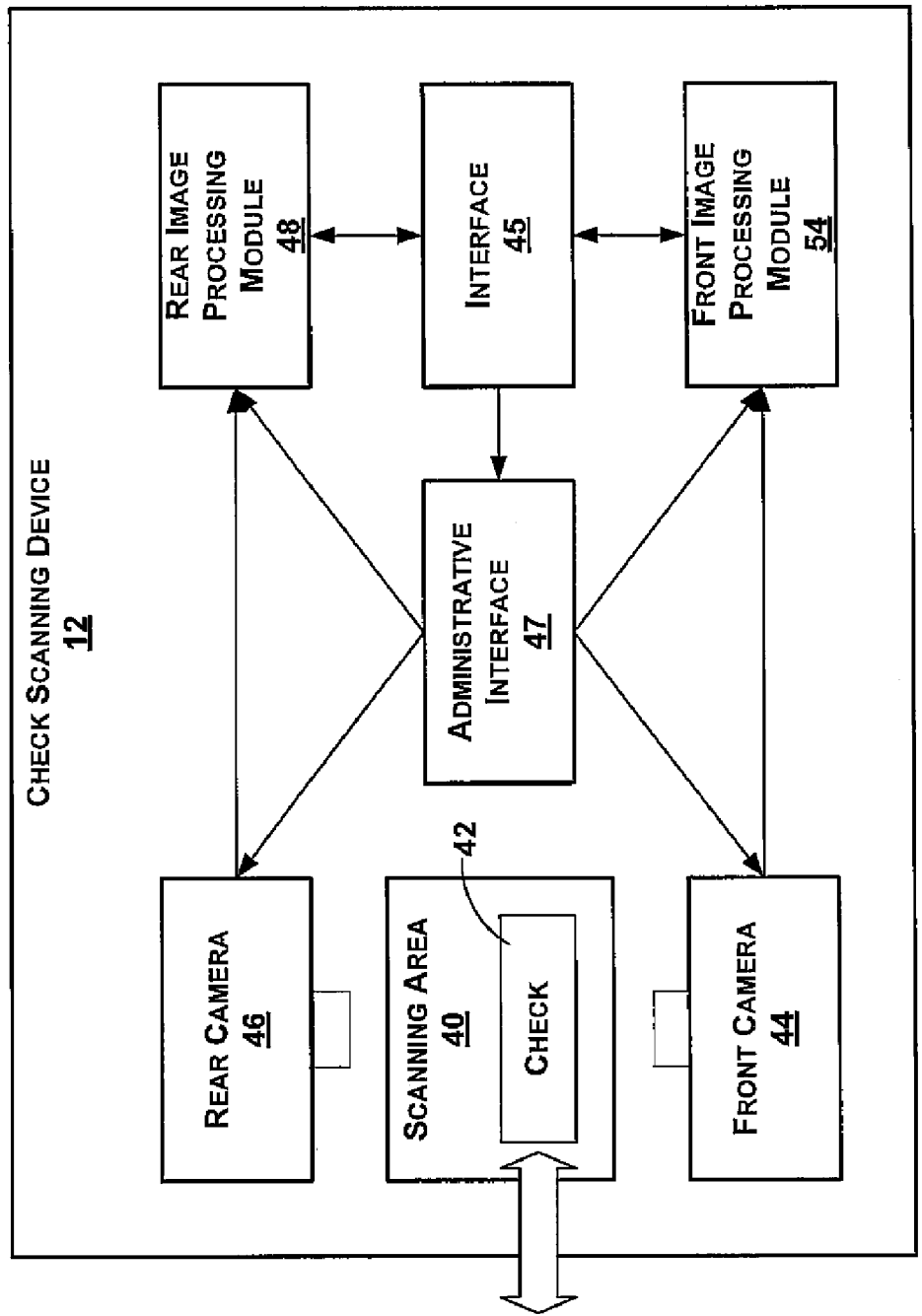
FIG. 3 is a block diagram illustrating example details of a check scanning device.

FIG. 3 is a block diagram illustrating example details of check scanning device 12. As illustrated in the example of FIG. 3, check scanning device 12 comprises a scanning area 40. Scanning area 40 is an area of check scanning device 12 that is capable of receiving checks to be scanned. In the example of FIG. 3, a check 42 is positioned within scanning area 40.

Check scanning device 12 includes s a front camera 44 and a rear camera 46. Front camera 44 is a mechanism that captures a digital image of a front side of check 42. Rear camera 46 is a mechanism that captures a digital image of a rear side of check 42. This disclosure may refer to front camera 44 and rear camera 46 as an "image capture unit" As used in this disclosure, an image capture unit is a unit that captures a digital image of the front side of a check and a digital image of the rear side of the check, either serially or in parallel. Note that under this definition of an image capture unit, the image capture unit may include a single camera that captures a digital image of one side of a check and then subsequently captures a digital image of the other side of the check.

When rear camera 46 captures a digital image of the rear side of check 42, rear camera 46 may provide the digital image of the rear side of check 42 to a rear image processing module 48 in check scanning device. Rear image processing module 48 may perform one or more graphics processing operations on the digital image of the rear side of the check. In a first example, rear image processing module 48 may perform a graphics operation that reduces the skew of the digital image of the rear side of the check. In a second example, rear image processing module 48 may perform a graphics operation that despeckles the digital image of the rear side of the check. In a third example, rear image processing module 48 may compress the digital image of the rear side of the check. In this third example, rear image processing module 48 may compress the digital image of the rear side of the check according to an International Telegraph and Telephone Consultative Committee (CCITT) Group TV format. Other example graphics operations may include normalization operations, grayscale remapping operations, thresholding operations, and other types of graphics operations.

Furthermore, when front camera 44 captures a digital image of the front side of check 42, front camera 44 may provide the digital image of the front side of check 42 to a front image processing module 54 in check scanning device 12. Front image processing module 54 may perform one or more graphics processing operations on the digital image of the front side of the check. Like rear image processing module 48, front image processing module 54 may perform deskewing operations, despeckling operations, compression operations, and other graphics processing operations.

When rear image processing module 48 performs the graphics operations on the digital image of the rear side of check 42, rear image processing module 48 provides the processed digital image to an interface 45 that enables check scanning device 12 to communicate with other devices. Similarly, when front image processing module 54 performs the graphics operations on the digital image of the front side of check 42, front image processing module 54 provides the digital image to interface 45. Interface 45 may be a network interface, such as an Ethernet card, a device bus interface card, such as a Universal Serial Bus (USB) card, a proprietary interface, an internal interface within a device, or another type of interface that enables communication with other devices. When interface 45 receives the digital image of the front side of check 42 and the digital image of the rear side of check 42, interface 45 may communicate the digital image of the front side of check 42 and the digital image of the rear side of check 42 to storage device 13 for storage.

Furthermore, as illustrated in the example of FIG. 3, check scanning device 12 includes an administrative interface 47. Administrative interface 47 may be a graphical user interface, a command line interface, or another type of user interface provided by check scanning device 12. An administrator may use administrative interface 47 to configure check scanning device 12. For example, the administrator may use administrative interface 47 to configure rear camera 46 and front camera 44 to capture digital images at certain levels of quality. In this example, the administrator may configure rear camera 46 to capture digital images at a resolution of 240 dots per inch and may configure front camera 44 to capture digital images at a resolution of 200 dots per inch.

In another example of how the administrator may use administrative interface 47 to configure check scanning device 12, the administrator may configure rear image processing module 48 and front image processing module 54 to perform particular sets of graphics operations. For instance, in this example, the administrator may use administrative interface 47 to configure rear image processing module 48 to compress the digital image of the rear side of the check to a particular compression level.

Figure 4:
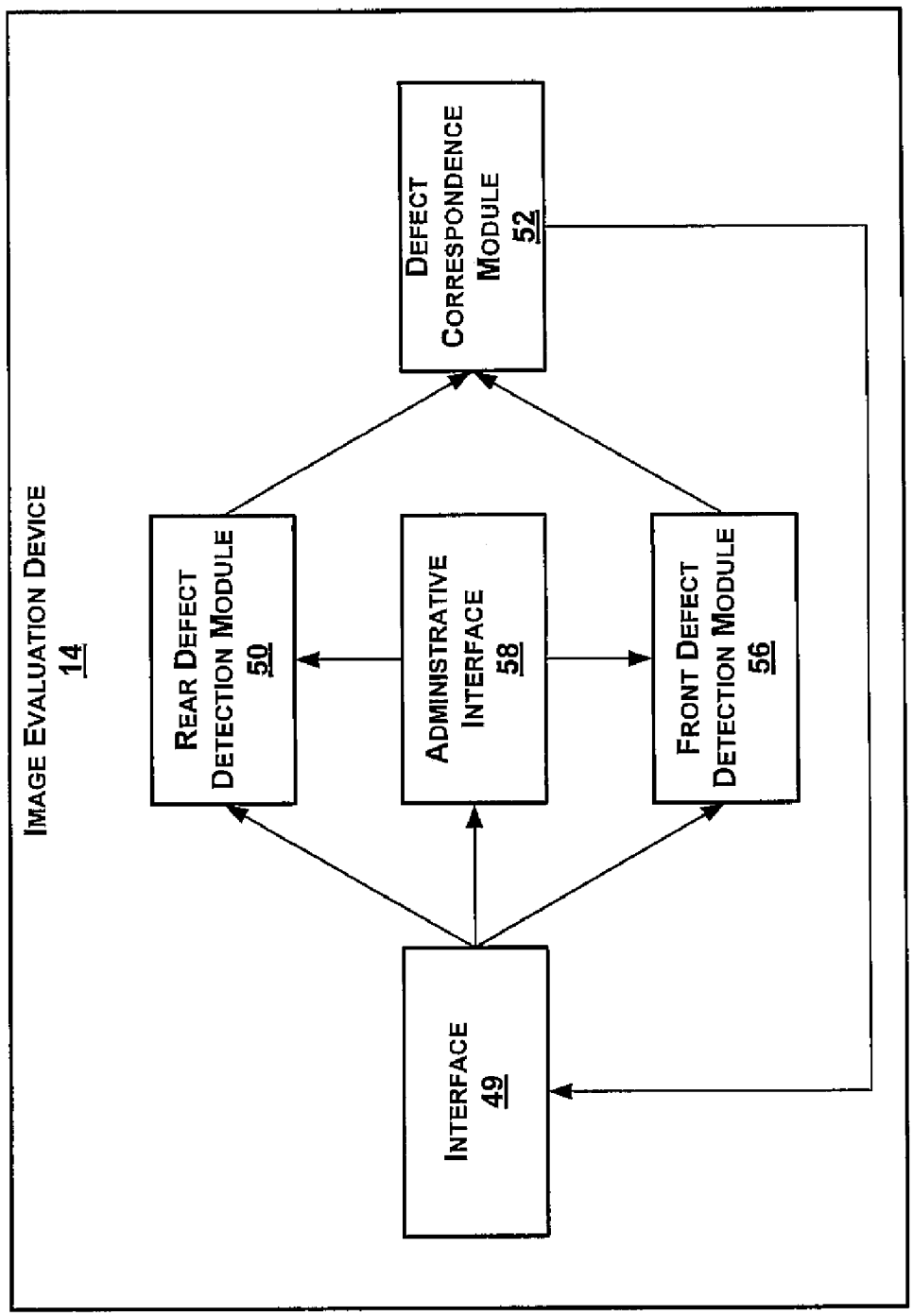
FIG. 4 is a block diagram illustrating example details of an image evaluation device.

FIG. 4 is a block diagram illustrating example details of image evaluation device 14. As illustrated in the example of FIG. 4, image evaluation device 14 includes an interface 49 that enables image evaluation device 14 to communicate with other devices. Interface 49 may be a variety of different types of interface. For instance, interface 49 may be a network interface, such as an Ethernet interface, a device bus interface card, such as a USB card, a proprietary interface, an internal interface within a device, or another type of interface. Interface 49 may receive a digital image of a front side of a check and a digital image of a rear side of the check from storage device 13.

When interface 49 receives these digital images of the check, interface 49 may provide the digital image of the rear side of the check to a rear defect detection (RDD) module 50. RDD module 50 analyzes the digital image of the rear side of the check to identify defects. For example, RDD module 50 may analyze the digital image of the rear side of the check to determine whether the digital image of the rear side of the check is too light or too dark. In another example, RDD module 50 may analyze the digital image of the rear side of the check to determine whether the digital image of the rear side of the check is excessively skewed. In a third example, RDD module 50 may analyze the digital image of the rear side of the check to determine whether the digital image of the rear side of the check suggests that an edge or corner of the check is torn or folded. After RDD module 50 analyzes the digital image of the rear side of the check to identify defects, RDD module 50 may provide the identified defects to a defect correspondence module 52.

Furthermore, when interface 49 receives the digital images of the check, interface 49 may provide the digital image of the front side of the check to a front defect detection (FDD) module 56. FDD module 56 analyzes the digital image of the front side of the check to identify defects. Like RDD module 50, FDD module 56 may detect defects such as too light, too dark, excessive skew, torn or folded corners or edges, and other defects. After FDD module 56 analyzes the digital image of the front side of the check to identify defects, FDD module 56 may provide the identified defects to defect correspondence module 52.

In some circumstances, RDD module 50 and FDD module 56 may incorrectly identify defects in the digital images of the sides of the check. RDD module 50 and FDD module 56 may incorrectly identify defects for a variety of reasons. For instance, RDD module 50 and FDD module 56 may be unable to properly identify information needed to determine whether the digital image includes a defect due to extraneous data or images on the check. This problem may be especially severe when FDD module 56 is attempting to detect defects in the digital image of the front sides of checks because the front sides of checks are more likely to contain background images that could make identification of key parts of the checks difficult. In addition, the front sides of check are more likely to include notes (e.g., memo lines, address changes, etc.) that could make identification of key parts of the checks difficult.

When defect correspondence module 52 receives defects identified in the rear side of the check, the identified defects may include one or more symmetric defects. As discussed above, a symmetric defect is a defect that can be identified from digital images of both sides of a check. For ease of explanation, symmetric defects in the digital image of the rear side of the check are referred to herein as rear-side symmetric defects. Furthermore, when defect correspondence module 52 receives defects identified in the front side of the check, the identified defects may include one or more symmetric defects. For ease of explanation, symmetric defects in the digital image of the front side of the check are referred to herein as front-side symmetric defects.

When defect correspondence module 52 receives the defects in the front side of the check and the defects in the rear side of the check, defect correspondence module 52 identifies ones of the front-side symmetric defects that correspond to ones of the rear-side symmetric defects. A front-side symmetric defect may correspond to a rear-side symmetric defect when the front-side symmetric defect is the same type of defect as the rear-side symmetric defect and when the front-side symmetric defect and the rear-side symmetric defect are associated with corresponding parts of the check. For example, a front-side symmetric defect that indicates that the bottom left corner of a check is torn may correspond to a rear-side symmetric defect that indicates that the bottom right corner of the check is torn. (Note that the paper on the left hand side of the front side of a check is the same paper as the right hand side of the rear side of the check.) In another example, a front-side symmetric defect that indicates that the bottom left corner of the check is torn does not correspond to a rear-side symmetric defect that indicates that the top left corner of the check is torn. This is because the front-side symmetric defect and the rear-side symmetric defect are not associated with corresponding parts of the check. In a third example, a front-side symmetric defect that indicates that the bottom left corner of the check is torn does not correspond to a rear-side symmetric defect that indicates that the check has excessive skew. This is because the front-side symmetric defect and the rear-side symmetric defect are of different types.

Defect correspondence module 52 may generate a data structure that includes a set of flags. Each of the flags may be associated with a type of defect. A standard may describe which flags are associated with which types of defects. For example, the "Draft Standard for Trial Use (DSTU) X9.37-2003, *Specifications for Electronic Exchange of Check and Image Data*", published by the American National Standards Institute (ANSI) defines a set of flags that describe defects in digital images of check.

When defect correspondence module 52 identifies a front-side symmetric defect that corresponds to a rear-side symmetric defect, defect correspondence module 52 may raise a flag that indicates that the digital image of the front side of the check and the digital image of the Tear side of the check actually include a symmetric defect. The flag may be a flag in a set of flags defined by the ANSI X9.37 standard. When defect correspondence module 52 identifies a front-side symmetric defect that does not correspond to a rear-side symmetric defect, defect correspondence module 52 does not raise a flag that indicates that the digital image of the front side of the check and the digital image of the rear side of the check actually include a symmetric defect.

After identifying ones of the front-side symmetric defects that correspond to ones of the rear-side symmetric defects and possibly raising one or more flags to indicate the presence of actual symmetric defects, defect correspondence module 52 may provide the flags to interface 49. In addition, defect correspondence module 52 may raise flags that indicate non-symmetric defect identified by RDD module 50 and FDD module 56. Defect correspondence module 52 may also provide these flags to interface 49. When interface 49 receives the flags from defect correspondence module 52, interface 49 may transmit the flags to storage device 13.

Furthermore, as illustrated in the example of FIG. 4, image evaluation device 14 comprises an administrative interface 58. Administrative interface 58 may be a graphical user interface, a command line interface, or another type of user interface provided by image evaluation device 14. An administrator may use administrative interface 58 to configure image evaluation device 14. For example, the administrator may use administrative interface 58 to configure rear defect detection module 50 and front defect detection module 56 to be more or less sensitive when identifying possible defects. For example, the administrator may use administrative interface 58 to configure rear defect detection module 50 to determine that a digital image of a rear side of a check has excessive skew only when rear defect detection module 50 determines that an angle between the bottom edge of the check and a lengthwise axis of the digital image is more than five degrees.

Figure 5:
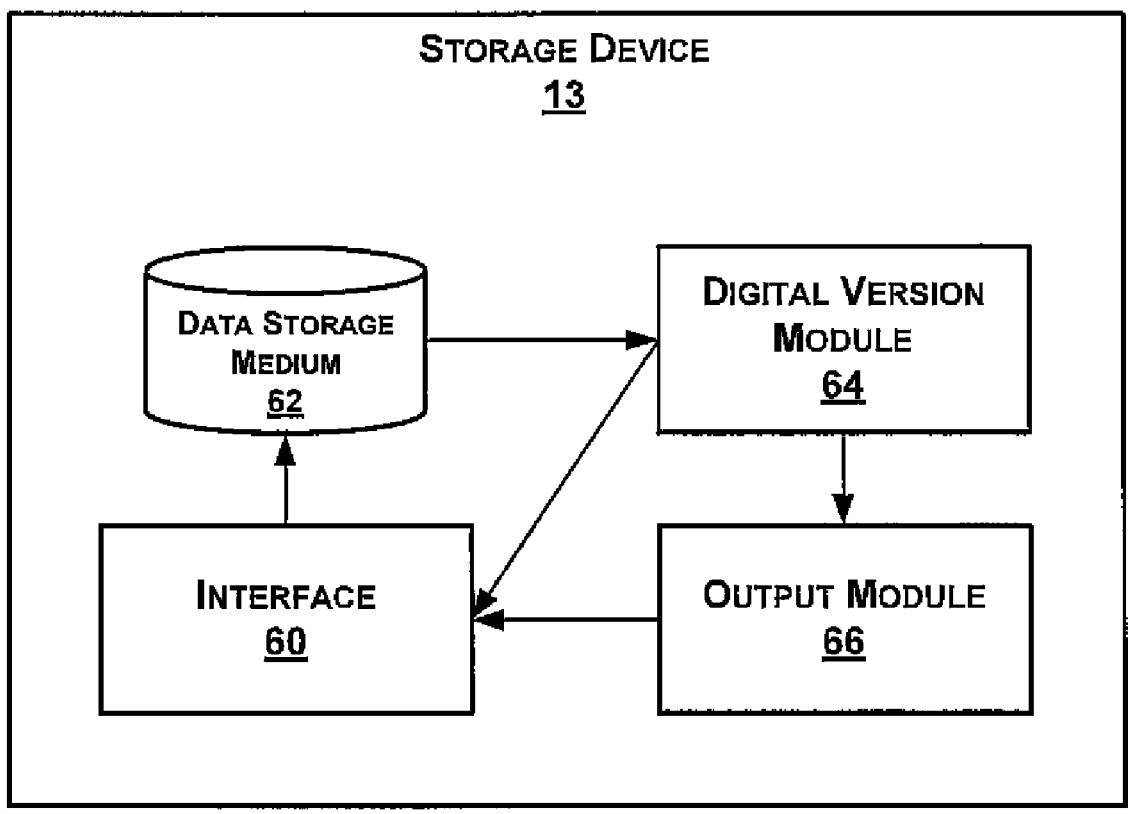
FIG. 5 is a block diagram illustrating example details of a storage device.

FIG. 5 is a block diagram illustrating example details of storage device 13. As illustrated in the example of FIG. 5, storage device 13 includes an interface 60. Interface 60 may be a network interface, such as all Ethernet card, a device bus interface card, such as a Universal Serial Bus (USB) card, a proprietary interface, an internal interface within a device, or another type of interface that enables communication with other devices. When image capture device 12 outputs a digital image of a front side of a check and a digital image of a rear side of the check, these digital images may be received by interface 60.

Upon receiving these digital images, interface 60 may store the digital images in a data storage medium 62. Data storage medium 62 may constitute one or more different types of data storage media including, random access memory (RAM)

units, magnetic disks, optical discs, flash memory units, magnetic tapes, and other types of data storage media.

A digital version module 64 in storage device 13 may receive a digital image of a front side of a check and a digital image of a rear side of the check from storage unit 62. After retrieving the digital images of the check, digital version module 64 may use interface 60 to send copies of the digital images of the check to image evaluation device 14. In response, image evaluation device 14 may send to storage device 13 a set of flags that indicate defects in the digital images of the check.

After receiving the set of flags, digital version module 64 may create a digital version of the check that includes the digital image of the front side of the check, the digital image of the rear side of the check, metadata that describes the check, and the set of flags. In this instance, the metadata may include the characters in the MICR code line of the check. The format of this data structure may be specified by industry or government regulations. After digital version module 64 generates the digital version of the check, digital version module 60 may provide the digital version of the check to an output module 66. However, it should be noted that in some implementations, digital version module 64 does not generate a digital version of the check when one or more flags in the set of flags are raised.

When output module 66 receives the digital version of the check, output module 66 may determine whether any of the flags are raised. If any of the flags are raised, output module 66 may determine that the digital image of the front side of the check and/or the digital image of the rear side of the check include defects that could hinder use of the digital images in an automated check clearing process. Output module 66 may be configured to perform a variety of different actions when output module 66 determines that the digital images include defects that could hinder use of the digital images in the automated check clearing process. In a first example, output module 66 may output an alert to a user of storage device 13. In this example, the user could manually inspect the digital version of the check to determine whether the digital images actually contain the defects. In a second example, output module 66 may use interface 47 to instruct check scanning device 12 to automatically rescan the check. In a third example, output module 66 may disregard the flags and cause the digital version of the check to be used in the automated check clearing process regardless of the defects in the digital images.

If none of the flags are raised or if output module 66 is configured to disregard the flags, output module 66 may cause interface 60 to transmit the digital version of the check via network 10 to a one of financial institutions 6 that holds a bank account for enterprise 4. Because the financial institutions may use the digital version of the check in an automated check clearing process, output module 66, by transmitting the digital version of the check, effectively causes the digital version of the check to be used in the automated check clearing process.

Output module 66 may cause interface 60 to transmit the digital version of the check to the financial institution in a variety of ways. For example, output module 66 may generate an email to which the digital version of the check is attached. In this example, output module 66 may cause interface 60 to send the email to the financial institution via network 10. In another example, output module 66 may formulate a Hypertext Transfer Protocol (HTTP) request to send the digital version of the check. Interface 60 may then send the HTTP request to the financial institution via network 10.

Figure 6:
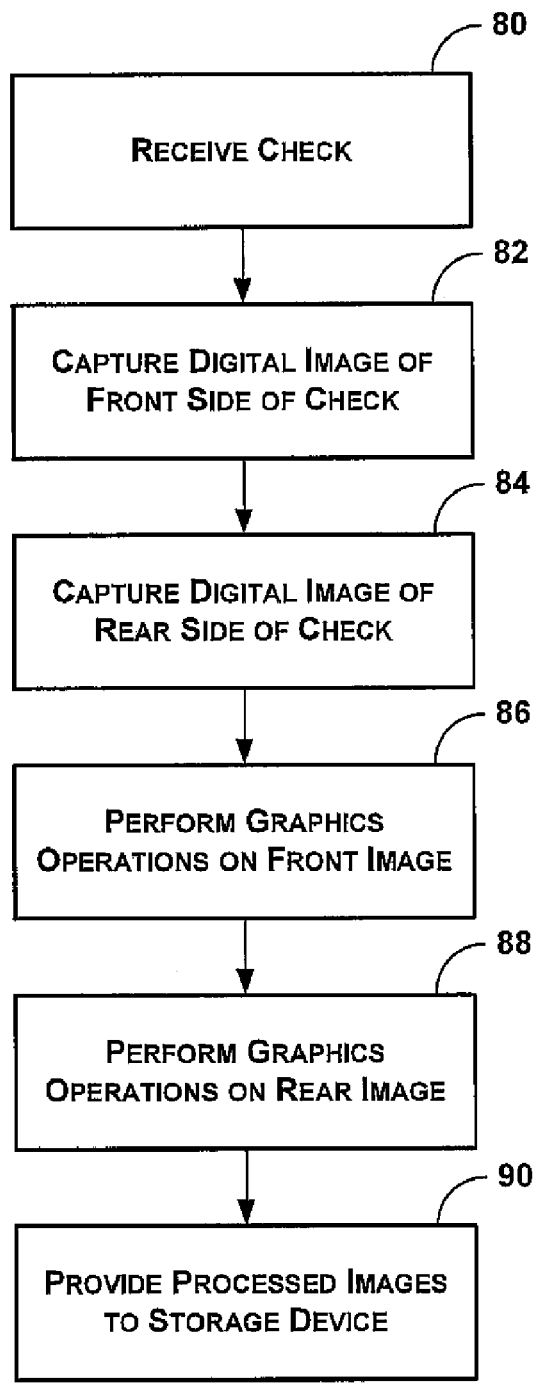
FIG. 6 is a flowchart illustrating an example operation of the check scanning device.

FIG. 6 is a flowchart illustrating an example operation of check scanning device 12. In the example of FIG. 6, the operation may begin when check scanning device 12 receives a check in scanning area 40 (80). Check scanning device 12 may receive the check in scanning area 40 in a variety of ways. For example, a user may manually place the check on scanning area 40. In another example, check scanning device 12 may include an automatic document feeder. In this example, a user may place one or more checks in an input tray of the automatic document feeder. The automatic document feeder may then individually feed each of the one or more checks into and out of scanning area 40. In this way, check scanning device 12 may be able to quickly scan a large number of checks without the need for a person to individually position each of the checks in scanning area 40.

After check scanning device 12 receives a check in scanning area 40, front camera 44 may capture a digital image of the front side of the check (82). Next, rear camera 46 may capture a digital image of the rear side of the check (84). Note that in some implementations, front camera 44 may be capturing the digital image of the front side of the check at the same time that rear camera 46 is capturing the digital image of the rear side of the check. In other implementations, front camera 44 may capture the digital image of the front side of the check before or after rear camera 46 captures the digital image of the rear side of the check. Furthermore, in some implementations, check scanning device 12 may only include a single camera. In these implementations, after the camera captures a digital image of one side of the check, a user may have to reposition the check within scanning area 40 such that the camera is able to capture a digital image of the other side of the check. Alternatively, in implementations in which scanning device 12 only includes a single camera, scanning device 12 may include a mechanism that automatically repositions the check such that the camera is able to capture digital images of both sides of the check.

After the digital image of the front side of the check is captured, front image processing module 54 may perform one or more graphics processing operations on the digital image of the front side of the check (86). Rear image processing module 48 may then perform one or more graphics processing operations on the digital image of the rear side of check (88). In some implementations, rear image processing module 48 may perform the graphics operations at the same time that front image processing module 54 is performing the graphics operations. It should also be appreciated that rear image processing module 48 and front image processing module 54 may perform different graphics processing operations. For instance, front image processing module 54 may perform a despeckling operation that rear image processing module 48 does not perform.

When front image processing module 54 and rear image processing module 48 finish performing the graphics operations on the digital images of the check, interface 45 may transmit the processed digital images to storage device 13 (90).

Figure 7:
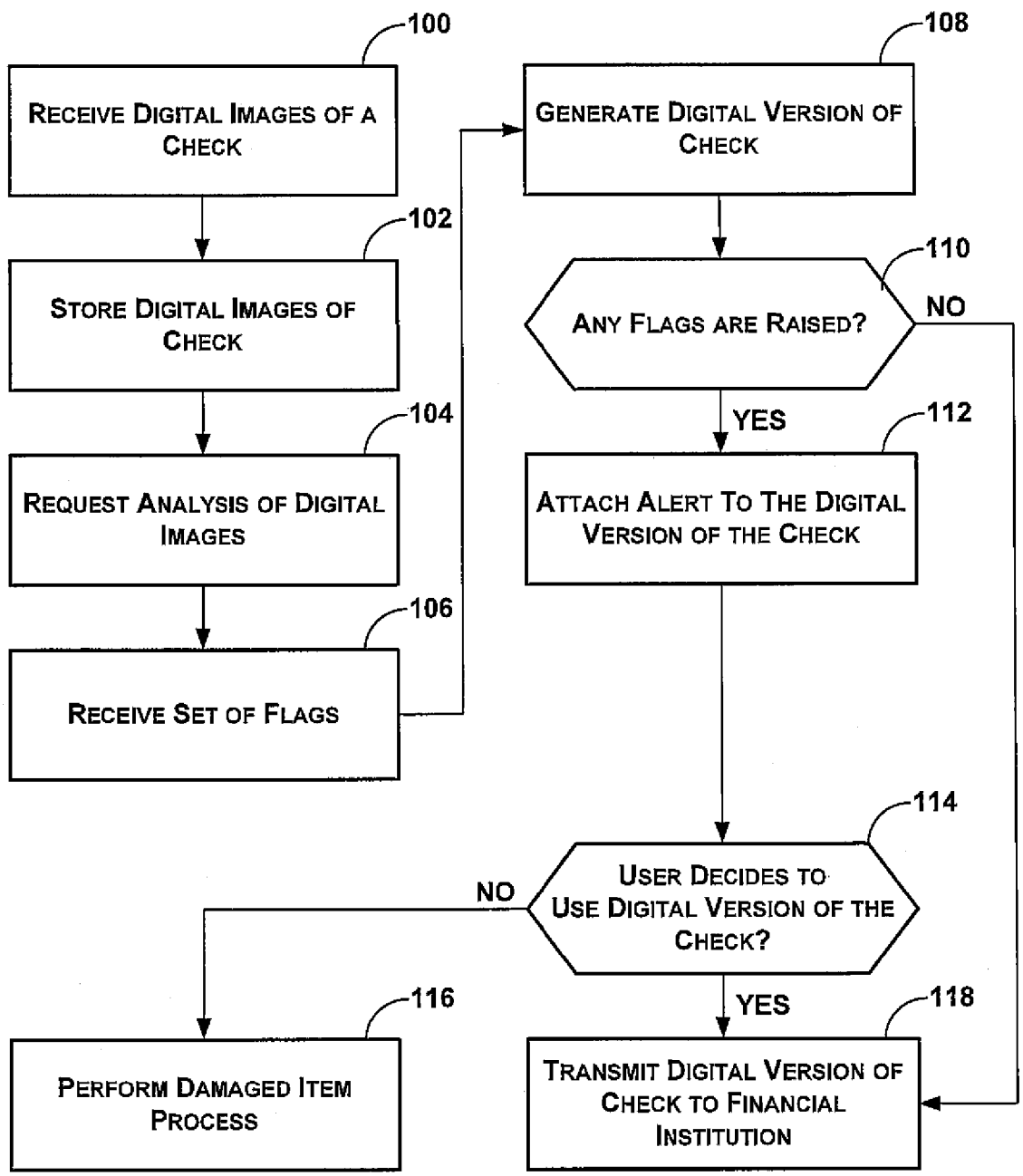
FIG. 7 is a flowchart illustrating an example operation of the storage device.

FIG. 7 is a block diagram illustrating an exemplary operation of storage device 13. As illustrated in the example of FIG. 7, interface 60 in storage device 13 may initially receive a digital image of a front side of a check and a digital image of a rear side of the check (100). When interface 60 receives the digital images of the front side of the check and the digital image of the rear side of the check, interface 60 may store the digital image of the front side of the check and the digital image of the rear side of the check into storage unit 62 (102).

After the digital images of the check have been stored in storage unit 62, digital version module 64 in storage device 13 may use interface 60 to request that image evaluation device 14 analyze the digital images of the check for defects (104). Subsequently, digital version module 64 may receive a set of flags from image evaluation device 14 that indicate defects in the digital images of the check (106). Next, digital version module 64 in image capture device 14 may generate a digital version of the check (108). As described above, the digital version of the check may include the digital image of the front side of the check, the digital version of the rear side of the check, and the flags.

After digital version module 64 generates the digital version of the check, output module 66 in storage device 13 may verify whether any of the flags are raised (110). If one or more of the flags are raised ("YES" of 110), output module 66 may attach an alert to the digital version of the check (112). After output module 66 attaches the alert to the digital version of the check, a user of storage device 13 may make a decision whether to use the digital version of the check in spite of the alert (114). For instance, the user may determine that the digital version of the check is usable after manually inspecting the digital version of the check to determine whether the defects are real. If the user decides not to use the digital version of the check ("NO" of 114), storage device 13 or enterprise 4 performs one or more actions in a damaged item policy that specifies how damaged documents are to be processed and forwarded (116) For example, an employee of enterprise 4 may insert the check into a translucent carrier envelope, capture digital images of the check while the check is in the carrier envelope, use these digital images to generate a new digital version of the check, and then forward the new digital version of the check to one of financial institutions 6. In another example, an employee of enterprise 4 may, after inserting the check in a translucent carrier envelope, pass the carrier envelope to one of financial institutions 6. It should be understood that many other damaged item policies are possible, including damaged item policies that do not include the use of carrier envelopes.

On the other hand, if none of the flags are raised ("NO" of 110) or if the user decides to use the digital version of the check in spite of the alert ("YES" of 114), output module 66 may use interface 60 to transmit the digital version of the check to one of financial institutions 6 (118). By transmitting the digital version of the check to one of financial institutions 6, output module 66 causes the digital version of the check to be used in the automated check clearing process.

It should be appreciated that storage device 13 may perform a variety of different actions after attaching the alert to the digital version of the check in step 112. For instance, output module 66 may cause interface 60 to transmit the digital version of the check regardless of the defects. For example, output module 66 may cause check scanning device 12 to automatically rescan the check.

Figure 8:
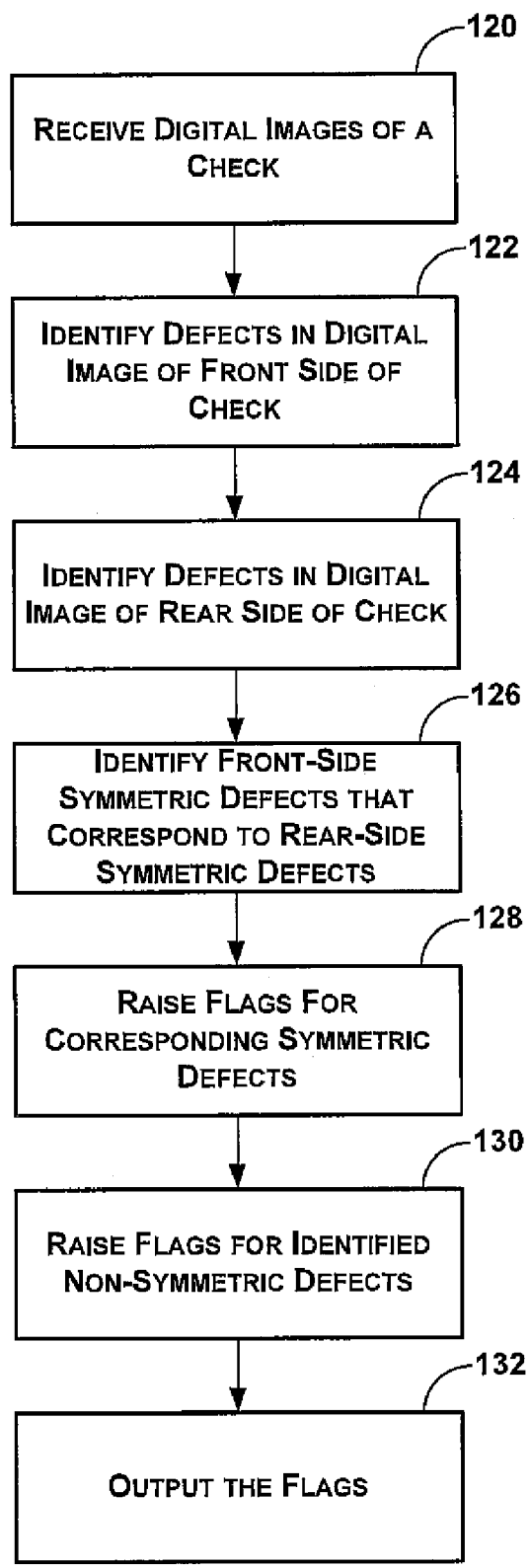
FIG. 8 is a flowchart illustrating an example operation of an image evaluation device.

FIG. 8 is a flowchart illustrating an example operation of image evaluation device 14. While FIG. 8 is explained with regard to image evaluation device 14, it should be appreciated that image evaluation devices 16 and image evaluation device 18 may also perform the operation illustrated in the example of FIG. 8. Furthermore, for purposes of explanation, this disclosure assumes that image evaluation devices 16 and image evaluation device 18 may include the components of image evaluation device 14 as illustrated in the example of FIG. 4.

Initially, interface 49 in image evaluation device 14 receives a digital image of a front side of a check and a digital image of a rear side of the check (120). After interface 49 receives the digital images of the check, FDD module 56 in image capture device 14 may identify one or more defects in the digital image of the front side of the check (122). In addition, RDD module 50 in image capture device 14 may identify one or more defects in the digital image of the rear side of the check (124). As discussed above, an administrator may use administrative interface 58 to configure FDD module 56 and RDD module 50. For instance, the administrator may establish different defect sensitivity levels for RDD module 50 and FDD module 56. In some implementations, RDD module 50 may identify defects in the digital image of the rear side of the check at the same time that FDD module 56 is identifying defects in the digital image of the front side of the check. The defects identified by RDD module 50 and FDD module 56 may include symmetric and non-symmetric defects. As mentioned above, this disclosure refers to symmetric defects identified by RDD module 50 as rear-side symmetric defects and refers to symmetric defects identified by FDD module 56 as front-side symmetric defects.

After FDD module 56 and RDD module 50 identify the defects, defect correspondence module 52 in image capture device 14 may identify ones of the front-side symmetric defects that correspond to ones of the rear-side symmetric defects (126). As discussed above, each of the symmetric defects may be associated with a type and each type may be associated with a flag. Accordingly, after defect correspondence module 52 identifies the ones of the front-side symmetric defects that correspond to ones of the rear-side symmetric defects, defect correspondence module 52 may raise flags associated with the types of the identified symmetric defects (128). In addition, each of the non-symmetric defects may be associated with a type and each type may be associated with a flag. Defect correspondence module 52 may raise the flags associated with the non-symmetric defects identified by FDD module 56 and RDD module 50 (130). Defect correspondence module 52 may then output the flags to a device that sent the digital images of the check to image evaluation device 14 (132).

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes and instructions may be stored in computer-readable media and executed by processors. The memory unit may be implemented within the processor or external to the processor, in which case it can be communicatively coupled to the processor via various means as is known in the art.

Various embodiments of the invention have been described. These and other embodiments are within the scope of the following claims.

The invention claimed is:

1. A method comprising:
receiving a first image, wherein the first image is a digital image of a front surface of a document;
receiving a second image, wherein the second image is a digital image of a rear surface of the document;
identifying defects in the first image that could hinder use of the first image and the second image to process the document in an automated document processing system;
identifying defects in the second digital image that could hinder use of the first image and the second image to process the document in the automated document processing system;
determining whether a first defect corresponds to any of the defects in the second image, wherein the first defect is one of the identified defects in the first image; and
outputting data that indicates that the first image and the second image include a defect that could hinder use of the first image and the second image in the automated document processing system when the first defect corresponds to one of the defects in the second image.

2. The method of claim 1, further comprising causing a digital version of the document to be used in the automated document processing system when the data indicates that the first defect does not correspond to any of the defects in the second image, wherein the digital version of the document includes the first image and the second image.

3. The method of claim 2,
wherein the document is a check;
wherein the automated document processing system is an automated check clearing system;
wherein receiving the first image comprises receiving the first image from an enterprise;
wherein receiving the second image comprises receiving the second image from the enterprise; and
wherein causing the digital version of the document to be used in the automated document processing system comprises submitting the digital version of the check to a check processing authority.

4. The method of claim 2, wherein the document is a type of document selected from a group consisting of: forms, remittance slips, legal documents, tax returns, orders, and invoices.

5. The method of claim 1,
wherein the method further comprises:
performing one or more graphics processing operations on the first image prior to identify the defects in the first image; and
performing one or more of the graphics processing operations on the second image prior to identifying the defects in the second image; and
wherein the graphics processing operations are selected from a group that consists of: a compression operation, a despeckling operation, and a deskewing operation.

6. The method of claim 1,
wherein identifying defects in the first image comprises:
using the first image to determine whether the document includes a document deficiency; and
identifying the first defect when it is determined using the first image that the document includes the document deficiency;
wherein identifying defects in the second image comprises:
using the second image to determine whether the document includes the document deficiency; and
identifying a second defect when it is determined using the second image that the document includes the document deficiency; and
wherein determining whether the first defect corresponds to any of the defects in the second image comprises determining whether the first defect and the second defect are associated with corresponding parts of the document,
wherein the document deficiency belongs to a group of document deficiencies that consists of: a fold and a tear.

7. The method of claim 1,
wherein identifying defects in the first image comprises:
determining whether the first image is excessively skewed; and
identifying the first defect when it is determined that the first image is excessively skewed;
wherein identifying defects in the second image comprises:
determining whether the second image is excessively skewed; and
identifying a second defect when it is determined that the second image is excessively skewed; and
wherein determining whether the first defect corresponds to any of the defects in the second image comprises determining whether both the first defect and the second defect are identified.

8. The method of claim 1,
wherein identifying defects in the first image comprises identifying a non-symmetric defect in the first image; and
wherein the method further comprises:
raising a flag associated with the non-symmetric defect, wherein the flag is a flag in a set of flags defined by a standards institution; and
determining whether any flags in the set of flags have been raised; and
wherein outputting data comprises outputting the flag associated with the non-symmetric defect.

9. A system that comprises an image evaluation device that includes:
a device comprising:
a front defect detection module that identifies defects in a first image that could hinder use of a first image to process a document in an automated electronic document processing system, wherein the first image is a digital image of a front surface of the document;
a rear defect detection module that identifies defects in a second image that could hinder use of the second image to process the document in the automated electronic document processing system, wherein the second image is a digital image of a rear surface of the document;
a defect correspondence module that determines whether a first defect corresponds to any of the defects in the second image, wherein the first defect is one of the identified defects in the first image; and
an output module that outputs data that indicates that the first image and the second image include a defect that could hinder use of the first image and the second image in the automated document processing system when the first defect corresponds to one of the defects in the second image.

10. The system of claim 9, further comprising a storage device that causes a digital version of the document to be used in the automated electronic document processing system when the data indicates that the first defect does not correspond to any of the defects in the second image, wherein the digital version of the document includes the first image and the second image.

11. The system of claim 10,
wherein the document is a check;
wherein the automated document processing system is an automated check clearing system;
wherein the image evaluation device further comprises a network interface that receives the digital version of the check from a financial institution; and
wherein the image verification module causes the digital version of the check to be used in the automated check clearing process by performing the automated check clearing process on the digital version of the check.

12. The system of claim 10,
wherein the document is a check;
wherein the automated document processing system is an automated check clearing system; and
wherein the storage device further comprises:
    a digital version module that generates the digital version of the check; and
    a network interface that automatically transmits the digital version of the check to a financial institution that uses the digital version of the check to perform the automated check clearing process.

13. The system of claim 9, wherein the system further comprises an image capture device that comprises:
    a front image processing module that performs one or more graphics processing operations on the first image before the front defect detection module identifies the defects in the first image; and
    a rear image processing module that performs one or more graphics processing operations on the second image before the rear defect detection module identifies the defects in the second image,
    wherein the graphics processing operations are selected from a group that consists of: a compression operation, a despeckling operation, a normalization operation, a grayscale remapping operation, a thresholding operation, and a deskewing operation.

14. The system of claim 9,
wherein the front defect detection module uses the first image to determine whether the document includes a document deficiency and identifies the first defect when the front defect detection module determines that the document includes the document deficiency;
wherein the rear defect detection module uses the second image to determine whether the document includes the document deficiency and identifies a second defect when the rear defect detection module determines that the document includes the document deficiency; and
wherein in order to determine whether the first defect corresponds to any of the defects in the second image, the defect correspondence module determines whether the first defect and the second defect are associated with corresponding parts of the document,
wherein the document deficiency belongs to a group of document deficiencies that consists of: a fold and a tear.

15. The system of claim 9,
wherein the front defect detection module determines whether the first image is excessively skewed aid identifies the first defect when it is determined that the first image is excessively skewed;
wherein the rear defect detection module determines whether the second image is excessively skewed and identifies a second defect when it is determined that the second image is excessively skewed; and
wherein in order to determine whether the first defect corresponds to any of the defects in the second image, the defect correspondence module determines whether the first defect and the second defect are identified.

16. The system of claim 9,
wherein the front defect detection module identifies a non-symmetric defect in the first image;
wherein the defect correspondence module raises a flag associated with the non-symmetric defect, wherein the flag is a flag in a set of flags defined by a standards institution; and
wherein the output module outputs the set of flags, thereby indicating that the first image includes a defect that could binder use of the first image and the second image in the automated document processing system.

17. A non-transitory computer-readable medium comprising instructions that, when executed by one or more processors, cause the one or more processors to:
    receive a first image, wherein the first image is a digital image of a front surface of a document;
    receive a second image, wherein the second image is a digital image of a rear surface of the document;
    identify defects in the first image that could hinder use of the first image and the second image to process the document in an automated document processing system;
    identify defects in the second digital image that could hinder use of the first image and the second image to process the document in the automated document processing system;
    determine whether a first defect corresponds to any of the defects in the second image, wherein the first defect is one of the identified defects in the first image; and
    generate data that indicates that the first image and the second image include a defect that could hinder use the first image and the second image in the automated document processing system when the first defect corresponds to one of the defects in the second image.

18. The computer-readable medium of claim 17, wherein the instructions further cause the one or more processors to automatically transmit the digital version of the document to a financial institution that uses the digital version of the document to perform the automated document processing system.

19. The computer-readable medium of claim 17,
wherein the instructions cause the one or more processors to identify defects in the first image at least in part by causing the one or more processors to:
    use the first image to determine whether the document includes a document deficiency; and
    identify the first defect when it is determined using the first image that the document includes the document deficiency;
wherein the instructions cause the one or more processors to identify defects in the second image at least in part by causing the one or more processors to:
    use the second image to determine whether the document includes the document deficiency; and
    identify a second defect when it is determined using the second image that the document includes the document deficiency; and
wherein the instructions cause the one or more processors to determine whether the first defect corresponds to any of the defects in the second image at least in part by causing the one or more processors to determine whether the first defect and the second defect are associated with corresponding parts of the document wherein the document deficiency belongs to a group of document deficiencies that consists of: a fold and a tear.

20. The computer-readable medium of claim 17,
wherein the instructions cause the one or more processors to identify defects in the first image at least in part by causing the one or more processors to:
 determine whether the first image is excessively skewed; and
 identify the first defect when it is determined that the first image is excessively skewed;
wherein the instructions cause the one or more processors to identify defects in the second image at least in part by causing the one or more processors to:
 determine whether the second image is excessively skewed; and
 identify a second defect when it is determined that the second image is excessively skewed; and
wherein the instructions cause the one or more processors to determine whether the first defect corresponds to any of the defects in the second image at least in part by causing the one or more processors to determine whether both the first defect and the second defect are identified.

* * * * *

UNITED STATES PATENT AND TRADEMARK OFFICE
CERTIFICATE OF CORRECTION

| | | |
|---|---|---|
| PATENT NO. | : 8,107,713 B2 | Page 1 of 1 |
| APPLICATION NO. | : 12/036339 | |
| DATED | : January 31, 2012 | |
| INVENTOR(S) | : Gary A. Bickell et al. | |

It is certified that error appears in the above-identified patent and that said Letters Patent is hereby corrected as shown below:

At column 19, claim number 15, line number 61, delete the word "aid" and insert the word -- and --.

Signed and Sealed this
Seventeenth Day of April, 2012

David J. Kappos
*Director of the United States Patent and Trademark Office*